US011815862B2

(12) United States Patent
Yedavalli

(10) Patent No.: US 11,815,862 B2
(45) Date of Patent: Nov. 14, 2023

(54) ROBUST CONTROL OF UNCERTAIN DYNAMIC SYSTEMS

(71) Applicant: Rama K. Yedavalli, Dublin, OH (US)

(72) Inventor: Rama K. Yedavalli, Dublin, OH (US)

(73) Assignee: ROBUST ENGINEERING SYSTEMS, LLC, Dublin, OH (US)

( * ) Notice: Subject to any disclaimer, the term of this patent is extended or adjusted under 35 U.S.C. 154(b) by 0 days.

(21) Appl. No.: 18/112,731

(22) Filed: Feb. 22, 2023

(65) Prior Publication Data

US 2023/0266725 A1 Aug. 24, 2023

Related U.S. Application Data

(60) Provisional application No. 63/312,458, filed on Feb. 22, 2022.

(51) Int. Cl.
*G05B 13/04* (2006.01)

(52) U.S. Cl.
CPC .................. *G05B 13/048* (2013.01)

(58) Field of Classification Search
CPC .................................. G05B 13/048
USPC .......................................... 700/45
See application file for complete search history.

(56) References Cited

U.S. PATENT DOCUMENTS

| 6,273,370 B1 * | 8/2001 | Colgren | G05D 1/0825 |
| | | | 701/6 |
| 9,296,474 B1 * | 3/2016 | Nguyen | G05B 13/048 |
| 2020/0116751 A1 * | 4/2020 | Tang | G05D 1/0825 |

FOREIGN PATENT DOCUMENTS

| CN | 105159065 A | * | 12/2015 | |
| CN | 105912011 A | * | 8/2016 | G05D 1/0808 |

OTHER PUBLICATIONS

"Robust Control of An Uncertain Nonlinear System With Unobservable Dynamics"; by Sarkar et al., Third International Conference on Advances in Control and Optimization of Dynamical Systems Mar. 13-15, 2014. Kanpur, India; 8 pages (Year: 2014).*

(Continued)

*Primary Examiner* — Ronald D Hartman, Jr.
(74) *Attorney, Agent, or Firm* — STANDLEY LAW GROUP LLP; Jeffrey Norris; Bryan Finneran

(57) ABSTRACT

Provided are a system and method for implementing control systems. One example includes configuring a processor to predict instability in control of a system by using multiple non-eigenvalue indices. Instability predictions may be communicated to an actuator of a device being controlled to regulate activity of the device. One example includes using transformation allergic indices (TAIs) as non-eigenvalue indices. One example includes using stability definite indices (SDIs) as novel introduced non-eigenvalue indices.

20 Claims, 28 Drawing Sheets

(56) References Cited

OTHER PUBLICATIONS

K. E. Kadrnka, "Multimode Instability Prediction Method," AIAA Structure, Structural Dynamics, and Materials Conference (Orlando, Fla.), AIAA-85-0737, Apr. 19185, vol. 2, pp. 453-442 (Year: 1985).*

P. O. M. Scokaert, D. Q. Mayne and J. B. Rawlings, "Suboptimal model predictive control (feasibility implies stability)," in IEEE Transactions on Automatic Control, vol. 44, No. 3, pp. 648-654, Mar. 1999, doi: 10.1109/9.751369.; (Year: 1999).*

Stability Analysis for Routh-Hurwitz Conditions Using Partial Pivot; N Erawaty, Kasbawati and A K Amir; Journal of Physics: Conference Series; N Erawaty et al 2019 J. Phys.: Conf. Ser. 1341 062017; doi:10.1088/1742-6596/1341/6/062017 (Year: 2019).*

Wikipedia definition of Routh-Hurwitz stability criterion; 6 pages; printed from the Internet on Jul. 11, 2023 (Year: 2023).*

\* cited by examiner $$\underset{28}{D1 = \begin{bmatrix} -0.5 & 0 & 0 & 0 & 0 & 0 \\ 0 & -0.5 & 0 & 0 & 0 & 0 \\ 0 & 0 & -0.5 & 0 & 0 & 0 \\ 0 & 0 & 0 & -0.5 & 0 & 0 \\ 0 & 0 & 0 & 0 & -0.5 & 0 \\ 0 & 0 & 0 & 0 & 0 & -0.5 \end{bmatrix}}$$

FIG. 2

$$\underset{30}{CMP6D1 = \begin{bmatrix} 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ -0.0156 & -0.1875 & -0.9375 & -2.5 & -3.75 & -3 \end{bmatrix}}$$

<u>32</u>

Eigenvalues of $CMP6D1$
$-0.6710 + j0$
$-0.5855 \pm j0.1481$
$-0.4145 \pm + j0.1481$
$-0.3290 + j0$

FIG. 3

$$TASS = \underset{34}{\begin{bmatrix} 0 & 0 & 0 & 0 & 0 & 0.5 \\ 0 & 0 & 0 & 0 & 0.5 & 0 \\ 0 & 0 & 0 & 0.5 & 0 & 0 \\ 0 & 0 & -0.5 & -1 & 0 & 0 \\ 0 & -0.5 & 0 & 0 & -1 & 0 \\ -0.5 & 0 & 0 & 0 & 0 & -1 \end{bmatrix}}$$

$$\underset{36}{[1 \quad 3 \quad 3.75 \quad 2.5 \quad 0.9375 \quad 0.1875 \quad 0.0156]}$$

FIG. 4

$$PTASS = \begin{bmatrix} 0.5 & 1 & 0 & 0 & 0 & 0 \\ 0 & 0 & 0 & 0 & 0.5 & 0 \\ 0 & 0 & 0.5 & 1 & 0 & 0 \\ 0 & 0 & -0.5 & 0 & 0 & 0 \\ 0 & 0 & 0 & 0 & -0.5 & 1 \\ -0.5 & 0 & 0 & 0 & 0 & 0 \end{bmatrix}$$

<u>38</u> and the Jordan matrix is given by $$JTASS = \begin{bmatrix} -0.5 & 1 & 0 & 0 & 0 & 0 \\ 0 & -0.5 & 0 & 0 & 0 & 0 \\ 0 & 0 & -0.5 & 1 & 0 & 0 \\ 0 & 0 & 0 & -0.5 & 0 & 0 \\ 0 & 0 & 0 & 0 & -0.5 & 1 \\ 0 & 0 & 0 & 0 & 0 & -0.5 \end{bmatrix}$$

FIG. 5

$$\underline{40}$$

$$A1 = \begin{bmatrix} 0 & 0 & 0 & 0 & 0 & 1/6 \\ 0 & 0 & 0 & 0 & 1/6 & 0 \\ 0 & 0 & 0 & 1/6 & 0 & 0 \\ 0 & 0 & -1/6 & -1/3 & 0 & 0 \\ 0 & -1/6 & 0 & 0 & -1/3 & 0 \\ -1/6 & 0 & 0 & 0 & 0 & -1/3 \end{bmatrix}$$

FIG. 6

$$\underline{42}$$

$$CMP6A1 = \begin{bmatrix} 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ -\varepsilon & -0.0008 & -0.0116 & -0.0926 & -0.4167 & -1 \end{bmatrix}$$

where $\varepsilon = 2.1433e - 05$.

$$\underline{44}$$

Eigenvalues of $CMP6A1$
$-0.3019 + j0$
$-0.2271 \pm j0.12$
$-0.0925 \pm + j0.0987$
$-0.0588 + j0$

FIG. 7

$$D1N = \begin{bmatrix} -1/6 & 0 & 0 & 0 & 0 & 0 \\ 0 & -1/6 & 0 & 0 & 0 & 0 \\ 0 & 0 & -1/6 & 0 & 0 & 0 \\ 0 & 0 & 0 & -1/6 & 0 & 0 \\ 0 & 0 & 0 & 0 & -1/6 & 0 \\ 0 & 0 & 0 & 0 & 0 & -1/6 \end{bmatrix}$$

FIG. 8

$$A2 = \begin{bmatrix} 0 & 0 & 0 & 0 & 0 & 1/6 \\ 0 & 0 & 0 & 0 & 1/6 & 0 \\ 0 & 0 & 0 & 1/6 & 0 & 0 \\ 0 & 0 & -1/6 & -1/6 & 0 & 0 \\ 0 & -1/6 & 0 & 0 & -1/6 & 0 \\ -1/6 & 0 & 0 & 0 & 0 & -1/6 \end{bmatrix}$$

FIG. 9

$$CMP6A2 = \underset{50}{\begin{bmatrix} 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ -\varepsilon & -0.0004 & -0.0046 & -0.0324 & -0.1667 & -0.5 \end{bmatrix}}$$

where $\varepsilon = 2.1433e - 05$.

FIG. 10

$$XI = \underset{52}{\begin{bmatrix} 1 & 0 & 0 & 1 \\ 0 & 1 & 1 & 0 \\ 0 & 1 & 1 & 0 \\ 1 & 0 & 0 & 1 \end{bmatrix}}; U_n \begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

FIG. 11

$$\underline{54}$$

$$A = \begin{bmatrix} a & b & c \\ d & e & f \\ g & h & i \end{bmatrix} ; A_{sign} = \begin{bmatrix} + & - & + \\ - & + & - \\ + & - & - \end{bmatrix} \quad (1)$$

$$Z = \begin{bmatrix} 0 & 0 & 1 \\ 1 & 0 & 0 \\ 0 & 1 & 0 \end{bmatrix} \quad (2)$$

$$A_c = \begin{bmatrix} i & g & h \\ c & a & b \\ f & d & e \end{bmatrix} ; A_{c,sign} = \begin{bmatrix} - & + & - \\ + & + & - \\ - & - & + \end{bmatrix} \quad (3)$$

FIG. 12

$$56 \rightarrow \quad QLSS4-1 = \begin{bmatrix} - & + & 0 & 0 \\ - & 0 & + & 0 \\ 0 & - & 0 & + \\ 0 & 0 & - & 0 \end{bmatrix}$$

$$QLSS4-2 = \begin{bmatrix} - & + & 0 & 0 \\ - & - & + & 0 \\ 0 & - & - & + \\ 0 & 0 & - & - \end{bmatrix}$$

FIG. 13

$$\underset{58}{A = \begin{bmatrix} -1/(4^3) & 1 & 0 & 0 \\ 0 & -1/(4^3) & 1 & 0 \\ 0 & 0 & -1/(4^3) & 1 \\ 0 & 0 & 0 & -1/(4^3) \end{bmatrix}}$$

Forming the TAIs, we get:

$TAI_1 = -2/(4^3)$
$TAI_2 = -2/(4^3)$

59

$$\underset{60}{A_{sym}} = \begin{bmatrix} -1/(4^3) & 0.5 & 0 & 0 \\ 0.5 & -1/(4^3) & 0.5 & 0 \\ 0 & 0.5 & -1/(4^3) & 0.5 \\ 0 & 0 & 0.5 & -1/(4^3) \end{bmatrix}$$

$$\underset{62}{A_{sksym}} = \begin{bmatrix} 0 & 0.5 & 0 & 0 \\ -0.5 & 0 & 0.5 & 0 \\ 0 & -0.5 & 0 & 0.5 \\ 0 & 0 & -0.5 & 0 \end{bmatrix}$$

$$\underset{64}{A_{augsymla} = A_{symlc} =} \begin{bmatrix} -1/(4^3) & 0.5 & 0 & 0 \\ 0.5 & -1/(4^3) & 0.5 & 0 \\ 0 & 0.5 & -1/(4^3) & 0.5 \\ 0 & 0 & 0.5 & -1/(4^3) \end{bmatrix}$$

FIG. 15

$$A_{augsksymla} = A_{sksymlc} = \underset{66}{\begin{bmatrix} 0 & 0.5 & 0 & 0 \\ -0.5 & 0 & 0.5 & 0 \\ 0 & -0.5 & 0 & 0.5 \\ 0 & 0 & -0.5 & 0 \end{bmatrix}}$$

FIG. 16

Consider $$A = \begin{bmatrix} -0.05 & 0.036 & 0.0006 & -9.8 \\ -0.369 & -2.02 & 30.0 & 0 \\ 0.02 & -0.04 & -3.2 & 0 \\ 0 & 0 & 1 & 0 \end{bmatrix}$$

68

Forming the TAIs, we get:

$TAI_1 = -0.025$
$TAI_2 = -2.61$

69

$$A_{symtc} = \begin{bmatrix} -0.05 & -0.1665 & 0.0103 & -4.9 \\ -0.1665 & -2.02 & 14.98 & 0 \\ 0.0103 & 14.98 & -3.2 & 0.5 \\ -4.9 & 0 & 0.5 & 0 \end{bmatrix}$$

70

$$A_{aksymtc} = \begin{bmatrix} 0 & 0.2025 & -0.0097 & -4.9 \\ -0.2025 & 0 & +15.02 & 0 \\ 0.0097 & -15.02 & 0 & -0.5 \\ 4.9 & 0 & 0.5 & 0 \end{bmatrix}$$

72

Consider 74

$$A = \begin{bmatrix} -1.5026 & -12.06 & 0.06 & 0 \\ -0.25 & -0.0329 & 1.0 & 0.5 \\ 0.25 & -4.0 & -1.0329 & 0 \\ 0 & 0.5 & 0 & -4.0026 \end{bmatrix}$$

Forming the TAIs, we get:

$TAI_1 = -2.7526$
$TAI_2 = -0.5329$

75

76
$$A_{symtc} = \begin{bmatrix} -1.5026 & -6.155 & 0.095 & 0 \\ -6.155 & -0.0329 & -1.5 & 0.5 \\ 0.095 & -1.5 & -1.0329 & 0 \\ 0 & 0.5 & 0 & -4.0026 \end{bmatrix}$$

78
$$A_{sksymtc} = \begin{bmatrix} 0 & -5.905 & -0.155 & 0 \\ 5.905 & 0 & 2.5 & 0 \\ 0.155 & -2.5 & 0 & 0 \\ 0 & 0 & 0 & 0 \end{bmatrix}$$

$$\underline{80} \quad A = \begin{bmatrix} -a & 1 & 0 & 0 & 0 \\ 0 & -a & 1 & 0 & 0 \\ 0 & 0 & -a & 1 & 0 \\ 0 & 0 & 0 & -a & 1 \\ 0 & 0 & 0 & 0 & -a \end{bmatrix}$$

Eigenvalues of $A$ are: $-a, -a, -a, -a, -a$.

another positive scalar $b = 4444$.

$$\underline{82} \quad Z = \begin{bmatrix} 0 & b & 0 & 0 & 0 \\ b & 0 & b & 0 & 0 \\ b & b & 0 & b & 0 \\ b & b & b & 0 & b \\ b & b & b & b & 0 \end{bmatrix}$$

Computing the linear, real, transformed matrix $A_{cleft} = Z * A * Z^{-1}$, we obtain the real matrix as $$A_{cleft} = \begin{bmatrix} -0.0003 & 0 & -1.00000 & 0 & 1.0000 \\ 0 & -1.0003 & 0 & 0 & 1.0000 \\ -0.0000 & -1.0000 & -1.0003 & 1.0000 & 1.000 \\ -0.0000 & -1.0000 & -1.0000 & -0.0003 & 2.0000 \\ -1.0000 & -2.0000 & -1.0000 & 1.0000 & 1.9997 \end{bmatrix}$$

$$1.0e+03\, AZ = \begin{bmatrix} 4.4440 & -0.0014 & 4.4440 & 0 & 0 \\ 4.4426 & 4.4440 & -0.0014 & 4.4440 & 0 \\ 4.4426 & 4.4426 & 4.4440 & -0.0014 & 4.4440 \\ 4.4426 & 4.4426 & 4.4426 & 4.4440 & -0.0014 \\ -0.0014 & -0.0014 & -0.0014 & -0.0014 & 0 \end{bmatrix}$$

and the Matrix Product $ZA$ is given by $$1.0e+03\, ZA = \begin{bmatrix} 0 & -0.0014 & 4.4440 & 0 & 0 \\ -0.0014 & 4.4440 & -0.0014 & 4.4440 & 0 \\ -0.0014 & 4.4426 & 4.4440 & -0.0014 & 4.4440 \\ -0.0014 & 4.4426 & 4.4426 & 4.4440 & -0.0014 \\ -0.0014 & 4.4426 & 4.4426 & 4.4426 & 4.4440 \end{bmatrix}$$

$$D = \begin{bmatrix} -0.2 & 0 & 0 & 0 & 0 \\ 0 & -0.2 & 0 & 0 & 0 \\ 0 & 0 & -0.2 & 0 & 0 \\ 0 & 0 & 0 & -0.2 & 0 \\ 0 & 0 & 0 & 0 & -0.2 \end{bmatrix}$$

FIG. 21

$$\underset{88}{Z = \begin{bmatrix} 4 & 12.5 & 0 & 0 & 0 \\ 12.5 & 4 & 12.5 & 0 & 0 \\ 0 & 12.5 & 4 & 12.5 & 0 \\ 0 & 0 & 12.5 & 4 & 12.5 \\ 0 & 0 & 0 & 12.5 & -1 \end{bmatrix}}$$

Computing the linear, real, transformed matrix $D_{eleft} = Z * D * Z^{-1}$, we obtain the real matrix as $$D_{eleft} = \begin{bmatrix} -0.2000 & -0.0000 & -0.0000 & 0.0000 & 0.0000 \\ 0 & -0.2000 & -0.0000 & 0.0000 & 0.0000 \\ 0 & 0.0000 & -0.2000 & 0 & -0.0000 \\ 0 & 0.0000 & -0.0000 & -0.20000 & 0.0000 \\ 0.0000 & 0.0000 & 0.0000 & 0.0000 & -0.2000 \end{bmatrix}$$

$$UT = \begin{bmatrix} -a & 1 & 0 & 0 & 0 \\ 0 & -a & 1 & 0 & 0 \\ 0 & 0 & -a & 1 & 0 \\ 0 & 0 & 0 & -a & 1 \\ 0 & 0 & 0 & 0 & -a \end{bmatrix}$$

where $a = 1/(6^5)$.

Eigenvalues of $UT$ are: 1.0e-03 * −0.1286 −0.1286 −0.1286 −0.1286 −0.1286 −0.1286.

Selection: positive scalar $b = 6^4 = 1296$.

Real, non-singular linear transformation denoted by Zss:

$$Zss = \begin{bmatrix} -a & b & 0 & 0 & 0 \\ b & -a & b & 0 & 0 \\ 0 & b & -a & b & 0 \\ 0 & 0 & b & -a & b \\ 0 & 0 & 0 & b & -a \end{bmatrix}$$

FIG. 23

$$\underline{92}$$

$$A1 = \begin{bmatrix} -a & 0 & 0 & 0 \\ 0 & -a & 0 & 0 \\ 0 & 0 & -a & 0 \\ 0 & 0 & 0 & -a \end{bmatrix}$$

where $a > 0$. Let $A2 = -A1$, i.e.

$$A2 = \begin{bmatrix} +a & 0 & 0 & 0 \\ 0 & +a & 0 & 0 \\ 0 & 0 & +a & 0 \\ 0 & 0 & 0 & +a \end{bmatrix}$$

$$B1 = \begin{bmatrix} 0 & 0 & 0 & +a \\ 0 & 0 & +a & 0 \\ 0 & +a & 0 & 0 \\ +a & 0 & 0 & 0 \end{bmatrix}; B2 = -B1 \quad (1)$$

$$C1 = \begin{bmatrix} 0 & 0 & 0 & -a \\ 0 & 0 & -a & 0 \\ 0 & +a & 0 & 0 \\ +a & 0 & 0 & 0 \end{bmatrix}; C2 = -C1 \quad (2)$$

FIG. 24

$$\underline{94}$$

$$X1 = \begin{bmatrix} +a & 0 & 0 & -a \\ 0 & +a & -a & 0 \\ 0 & -a & +a & 0 \\ -a & 0 & 0 & +a \end{bmatrix}; X2 = -X1 \quad (3)$$

$$X3 = \begin{bmatrix} -a & 0 & 0 & -a \\ 0 & -a & -a & 0 \\ 0 & +a & -a & 0 \\ +a & 0 & 0 & -a \end{bmatrix}; X4 = -X3 \quad (4)$$

$$X5 = \begin{bmatrix} -a & 0 & 0 & -a \\ 0 & -a & -a & 0 \\ 0 & +a & +a & 0 \\ +a & 0 & 0 & +a \end{bmatrix}; X6 = -X5 \quad (5)$$

FIG. 25

$$TASNRP-1 = X1 = \underset{96}{\begin{bmatrix} 0 & 0 & 0 & + \\ 0 & 0 & + & 0 \\ 0 & - & - & 0 \\ - & 0 & 0 & - \end{bmatrix}}$$

$$X2 = \underset{98}{\begin{bmatrix} - & 0 & 0 & + \\ 0 & - & + & 0 \\ 0 & + & 0 & 0 \\ - & 0 & 0 & 0 \end{bmatrix}}$$

FIG. 26

$$NI4_{tamamd} = \begin{bmatrix} 0 & 0 & 0 & -1 \\ 0 & 0 & -1 & 0 \\ 0 & -1 & 0 & 0 \\ -1 & 0 & 0 & 0 \end{bmatrix}$$

100

$$-NI4_{tamamd} = \begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

$$D = X = \begin{bmatrix} a_{11} & 0 & 0 & a_{14} \\ 0 & a_{22} & a_{23} & 0 \\ 0 & a_{32} & a_{33} & 0 \\ a_{41} & 0 & 0 & a_{44} \end{bmatrix}$$

$$X_{md} = D = \begin{bmatrix} a_{11} & 0 & 0 & 0 \\ 0 & a_{22} & 0 & 0 \\ 0 & 0 & a_{33} & 0 \\ 0 & 0 & 0 & a_{44} \end{bmatrix}$$

$$X_{mantd} = \begin{bmatrix} 0 & 0 & 0 & a_{14} \\ 0 & 0 & a_{23} & 0 \\ 0 & a_{32} & 0 & 0 \\ a_{41} & 0 & 0 & 0 \end{bmatrix}$$

FIG. 29

$$X_{mantdsym} = \begin{bmatrix} 0 & 0 & 0 & as_{14} \\ 0 & 0 & as_{23} & 0 \\ 0 & as_{23} & 0 & 0 \\ as_{14} & 0 & 0 & 0 \end{bmatrix}$$

where
$(a_{14} + a_{41})/2 = as_{14}$
and
$(a_{23} + a_{32})/2 = as_{23}$

FIG. 30

$$\underline{110}$$

$$CMP1 = \begin{bmatrix} 0 & 1 & 0 & 0 \\ 0 & 0 & 1 & 0 \\ 0 & 0 & 0 & 1 \\ -\tau_4 & -\tau_3 & -\tau_2 & -\tau_1 \end{bmatrix}$$

FIG. 31

$$\underline{112}$$

$$D = X1 = \begin{bmatrix} -1 & 0 & 0 & 0 \\ 0 & -2 & 0 & 0 \\ 0 & 0 & -3 & 0 \\ 0 & 0 & 0 & -4 \end{bmatrix}$$

FIG. 32

$$\underline{114}$$

$$CMP1 = \begin{bmatrix} 0 & 1 & 0 & 0 \\ 0 & 0 & 1 & 0 \\ 0 & 0 & 0 & 1 \\ -0.2017 & -0.4202 & -0.2941 & -0.0840 \end{bmatrix}$$

$$X2 = \begin{bmatrix} +0.5 & 0 & 0 & 0 \\ 0 & -1 & 0 & 0 \\ 0 & 0 & +0.2 & 0 \\ 0 & 0 & 0 & -0.5 \end{bmatrix}$$

$$A_{long} = \begin{bmatrix} X_u & X_w & X_q & -g \\ Z_u & Z_w & U_0 & 0 \\ M_u & M_w & M_q & 0 \\ 0 & 0 & 1 & 0 \end{bmatrix}$$

$$A_{long} = \begin{bmatrix} -0.045 & 0.036 & 0.0006 & -32.2 \\ -0.369 & -2.02 & 168.8 & 0 \\ 0.0019 & -0.0390 & -2.948 & 0 \\ 0 & 0 & 1 & 0 \end{bmatrix}$$

$$Z = \begin{bmatrix} -1 & -2 & -3 & -4 \\ -4 & -3 & -2 & -1 \\ -3 & -1 & -2 & -4 \\ -2 & -3 & -4 & -1 \end{bmatrix}$$

$A_{eright} = Z^{-1}A_{long}Z$ and $A_{eleft} = ZA_{long}Z^{-1}$ as given by $$A_{eleft} = \begin{bmatrix} -133.9957 & -153.6559 & 113.4071 & 203.8103 \\ -225.8514 & -235.4787 & 170.7371 & 327.1360 \\ -91.2557 & -81.0571 & 56.7952 & 122.2992 \\ -204.4985 & -229.6828 & 168.9026 & 307.6663 \end{bmatrix}$$

$$A_{eright} = \begin{bmatrix} 45.7246 & 45.5762 & 62.0492 & 41.8360 \\ 237.8990 & 29.5570 & 104.3822 & 355.1698 \\ -201.7509 & -37.9248 & -103.1773 & -292.0160 \\ 4.8578 & -21.1243 & -22.5359 & 22.8827 \end{bmatrix}$$

FIG. 37

$$TASNRP-1 = \begin{bmatrix} 0 & 0 & 0 & + \\ 0 & 0 & + & 0 \\ 0 & - & - & 0 \\ - & 0 & 0 & - \end{bmatrix}$$

$$TASNRP-2 = \begin{bmatrix} - & 0 & 0 & + \\ 0 & - & + & 0 \\ 0 & - & 0 & 0 \\ - & 0 & 0 & 0 \end{bmatrix}$$

$$TASNRP-3 = \begin{bmatrix} - & + & 0 & 0 \\ - & 0 & + & 0 \\ 0 & - & 0 & + \\ 0 & 0 & - & 0 \end{bmatrix}$$

$$TASNRP - X = TASNRP - 1 = \begin{bmatrix} 0 & 0 & 0 & +2 \\ 0 & 0 & +0.5 & 0 \\ 0 & -1.2 & -3 & 0 \\ -1.5 & 0 & 0 & -0.2 \end{bmatrix}$$

$$TASNRP - BAND = QLSS - 1 = \begin{bmatrix} -0.2 & +2 & 0 & 0 \\ -1.5 & 0 & +0.5 & 0 \\ 0 & -1.2 & 0 & 1 \\ 0 & 0 & -1 & 0 \end{bmatrix}$$

$$SuperCMP4A = \begin{bmatrix} 0 & 1 & 0 & 0 \\ 0 & 0 & 1 & 0 \\ 0 & 0 & 0 & 1 \\ -c_{4a} & -c_{3a} & -c_{2a} & -c_{1a} \end{bmatrix}$$

$$SubCMP4A = \begin{bmatrix} -c_{1a} & -c_{2a} & -c_{3a} & -c_{4a} \\ 1 & 0 & 0 & 0 \\ 0 & 1 & 0 & 0 \\ 0 & 0 & 1 & 0 \end{bmatrix}$$

FIG. 40

$$\underline{130}$$

$$A_{long} = \begin{bmatrix} -0.045 & 0.036 & 0.0006 & -32.2 \\ -0.369 & -2.02 & 168.8 & 0 \\ 0.0019 & -0.039 & -2.948 & 0 \\ 0 & 0 & 1 & 0 \end{bmatrix}$$

FIG. 41

$$\underline{132}$$

$$A_{symtc} = \begin{bmatrix} -0.045 & -0.1665 & 0.00125 & -16.1 \\ -0.1665 & -2.02 & 84.3805 & 0 \\ 0.00125 & 84.3805 & -2.948 & 0.5 \\ -16.1 & 0 & 0.5 & 0 \end{bmatrix}$$

$$A_{sksymtc} = \begin{bmatrix} 0 & 0.2025 & -0.0006 & -16.1 \\ -0.2025 & 0 & +84.4195 & 0 \\ 0.0006 & -84.4195 & 0 & -0.5 \\ 16.1 & 0 & 0.5 & 0 \end{bmatrix}$$

FIG. 42

$$\underline{134}$$

$$SubCMP4A$$
$$= \begin{bmatrix} -5.0130 & -12.775 & -0.653 & -0.5870 \\ 1 & 0 & 0 & 0 \\ 0 & 1 & 0 & 0 \\ 0 & 0 & 1 & 0 \end{bmatrix}$$

FIG. 43

$$\underline{136}$$

$$TASubCMP4A =$$
$$\begin{bmatrix} -0.03084 & -0.03431 & -0.67137 & -0.26345 \\ 1 & 0 & 0 & 0 \\ 0 & 1 & 0 & 0 \\ 0 & 0 & 1 & 0 \end{bmatrix}$$

FIG. 44

ROBUST CONTROL OF UNCERTAIN DYNAMIC SYSTEMS

CROSS-REFERENCE TO RELATED APPLICATIONS

The present application is a non-provisional application claiming priority to U.S. Provisional App. No. 63/312,458, filed on Feb. 22, 2022, the contents of which are hereby incorporated by reference as if fully recited herein.

TECHNICAL FIELD

Embodiments of the present disclosure relate to a system and method for implementing control systems according to one or more exemplary actuator adjustment algorithms configured to permit implementation of one or more control objectives. In one example embodiment, a processor may be configured to predict instability in control of a system by determining multiple non-eigenvalue indices, which are not known with current practices. Instability predictions may be communicated to an actuator of a device being controlled according to an exemplary embodiment to regulate activity of the device. In one example embodiment, transformation allergic indices (TAIs) are employed as non-eigenvalue indices. In one example embodiment, stability definite indices (SDIs) are employed as non-eigenvalue indices.

BACKGROUND AND SUMMARY OF THE INVENTION

Control systems may be crucial in any number of different aspects of daily life. Control systems, particularly digital control systems, may be involved with regulating any number of different technologies. By way of example not limitation, simple control systems may regulate washers, dryers, home heating systems, home cooling systems, and the like. More complicated and safety critical control systems may regulate robotic surgery devices, satellite formation flying, commercial and military aircraft autopilot functioning, aircraft turbine engine control, hypersonic flight vehicle control, spacecraft and/or satellite attitude control, or the like. Often times, proper functioning of a control system is crucial for ensuring the survival of individuals relying on the control system, and/or errors with a control system may result in catastrophe. By way of example and not limitation, an error with an aircraft control system and/or a spacecraft control system may result in damage, crashing, emergency landing, other emergency procedures, some combination thereof, or the like (referred to herein as "aircraft incidents" or "spacecraft incidents"). Although aircraft and spacecraft incidents may not necessarily be commonplace, the number and severity of such incidents may still be far higher than optimal. Designing and applying a well performing and highly reliable control system may often be a technical challenge in a technology-driven society.

Current practice control system design may include a Linear Dynamic System controlled according to a mathematical model comprising differential equations (e.g., Model Based Control System design, referred to herein as "MBCS"). With MBCS, control systems design may be addressed in a mathematical system-level viewpoint initially, then system-level control laws may be applied to a particular application, including by way of example and not limitation, mechanical systems (e.g., automotive vehicle dynamics and control, such as cruise control and vibration suppression of an automobile chassis, robotics, and the like), aerospace systems (e.g., aero vehicles such as fixed-wing aircraft, rotorcrafts such as helicopters and quadcopters, drones, other aerial vehicles, missiles, upcoming urban air mobility applications such as air taxis, and the like; e.g., space vehicles such as satellite attitude dynamics and control, and the like), and electrical systems (e.g., power systems, micro-grid stability, and the like). At the system level, a mathematical model employed may correspond to the specific discipline (e.g., the dynamics matrix of the specific system).

With MBCS algorithms, a control law may be designed based on mathematical properties of a dynamics matrix. As a specific, non-limiting example, with a fixed wing aircraft autopilot design, up-and-down dynamic motion (pitch motion or longitudinal motion) of the aircraft may be captured in a mathematical model described by matrices (e.g., dynamics capturing matrices). Dynamics capturing matrices may include critical parameters (aerodynamic stability derivatives) pertaining to the lift, drag, pitching moment, angle of attack, pitch angle, forward speed, vertical speed, and the like aspects of the aircraft. Said parameters may provide the elements of a dynamics matrix, and stability investigation thereof may provide stability investigation of the aircraft (see e.g., "Flight Dynamics and Control of Aero and Space Vehicles," authored by the present inventor).

A control system may comprise any number of sensors, each of which may measure information pertaining to one or more variables to be controlled. A control system may further comprise a number of actuators (e.g., servomotors) which may be used to deflect (move) one or more control surfaces (e.g., elevators, ailerons, rudders, and/or any other control surface). Thus, sensors and actuators may work together in a feedback control-based control system to regulate an output variable (the controlled variable) as desired by one or more users and/or administrators. As a non-limiting example, output variables may be sensed, and information related thereto may be input in a control computer configured to generate a control law. Control computer output signals may be electronically communicated to the actuators (e.g., servomotors), and the actuators may deflect the control surface to substantially correct positions (e.g., angles) in order to achieve a control objective.

With current practice control systems design (e.g., involving MBCS algorithms), to, by way of example and not limitation, stabilize an unstable system, improve the speed of control objective realization, some combination thereof, or the like, it may be important to determine when instability may occur to tailor the system to avoid said instability. For predicting instability in advance in a mathematical setting, eigenvalues of a corresponding dynamics matrix are being used as instability prediction measures in the current practice (e.g., a common practice with known autopilot designs) (example of a "TC approach" as described in more detail below). Generally speaking, TC approaches are so ingrained in the current practice (dating back to 1905 since Routh-Hurwitz criterion days) that the current thought process equates state variable convergence of a real matrix with negative real part eigenvalue criterion. However, eigenvalues are ineffective for predicting instability. An exemplary TA approach, described in more detail below, accounts for the ineffectiveness of eigenvalues.

As a non-limiting example, when eigenvalues are used, they predict that instability will occur if an elevator deflection exceeds X degrees. Current practice control system design techniques which use eigenvalues may suffer from a number of drawbacks potentially affecting the accuracy of instability predictions (e.g., perhaps instability actually occurs where deflection exceeds Y degrees, where Y<X) (e.g., where a certain deflection angle is particularly detrimental to device operation, said deflection angle may not be reflected in eigenvalues of a dynamic matrix). Although in certain known applications, a cushion or margin of error may be associated with eigenvalues to reduce the risk of certain dangers, said cushions or margins of error may still be inadequate for controlling devices involving significant perturbations (e.g., adverse weather conditions, high angle maneuvering in military aircraft where safety may be compromised).

The aforementioned shortcomings speak to the need for an improved technique for implementing robust control systems.

In view of this, it is beneficial to have control system implementation involving robust control of relevant devices, wherein the control system is capable of withstanding any number of different perturbations, and wherein speed and efficiency of addressing perturbations is improved.

Accordingly, an exemplary embodiment of the present invention provides a system and its corresponding method for implementing control systems. An exemplary system and its corresponding method may involve a number of exemplary actuator adjustment algorithms configured to permit implementation of one or more control objectives, and may be capable of providing an exemplary control system that is robust (e.g., capable of withstanding any number of different perturbations). System feedback may dictate system control to account for any number of different predicted and emerging risks proactively or in real time.

According to the present invention in one aspect, an exemplary system may include a processor, a device, adapted to be controlled by the processor, an actuator, and a sensor. It is not necessarily required that an exemplary embodiment include the actuator and the associated device. The sensor may be adapted to communicate to the processor a measured variable of the device. The actuator may be adapted to regulate performance of the device. The processor may be configured to predict instability in control of the device by using a plurality of novel introduced non-eigenvalue indices. The processor may be configured to adjust the device by providing feedback to the actuator reflecting instability control predicted by the processor.

According to the present invention in another aspect, an exemplary method may include providing a processor, providing a device, the device adapted to be controlled by the processor, providing an actuator, and providing a sensor. It is not necessarily required that an exemplary embodiment include providing the actuator and providing the associated device. The exemplary method may further include configuring the sensor to communicate to the processor a measured variable of the device. The method may further include configuring the actuator to regulate performance of the device. The method may further include configuring the processor to predict instability control of the device by using a plurality of novel non-eigenvalue indices. The method may also include configuring the processor to adjust the device by providing feedback to the actuator reflecting instability control predicted by the processor.

In certain embodiments, exemplary non-eigenvalue indices include a transformation allergic index and a stability definite index. Using exemplary non-eigenvalue indices, the processor may be configured to determine whether all linear combination state variable convergence occurs based on the measured variable.

With exemplary embodiments of the present invention, exemplary control system implementation may improve the speed and efficiency through which perturbations are addressed by the control system. Embodiments and aspects described herein may be useful in various engineering disciplines, such as aerospace, automotive, robotics, microgrid stability, electrical energy, power systems, some combination thereof, or the like. Additional advantages will become apparent to those of ordinary skill in the art based on the drawings and detailed description thereof.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 2 illustrates an exemplary matrix related to demonstrating an advantage of an exemplary embodiment;

FIG. 3 also illustrates an exemplary matrix related to demonstrating an advantage of an exemplary embodiment;

FIG. 4 also illustrates an exemplary matrix related to demonstrating an advantage of an exemplary embodiment;

FIG. 5 illustrates exemplary matrices related to demonstrating an advantage of an exemplary embodiment;

FIG. 6 also illustrates an exemplary matrix related to demonstrating an advantage of an exemplary embodiment;

FIG. 7 also illustrates an exemplary matrix related to demonstrating an advantage of an exemplary embodiment;

FIG. 8 also illustrates an exemplary matrix related to demonstrating an advantage of an exemplary embodiment;

FIG. 9 also illustrates an exemplary matrix related to demonstrating an advantage of an exemplary embodiment;

FIG. 10 also illustrates an exemplary matrix related to demonstrating an advantage of an exemplary embodiment;

FIG. 11 also illustrates exemplary matrices related to demonstrating an advantage of an exemplary embodiment;

FIG. 12 also illustrates exemplary matrices related to demonstrating an advantage of an exemplary embodiment;

FIG. 13 illustrates exemplary sign matrices of exemplary 4th order QLSS matrices;

FIG. 15 illustrates an exemplary matrix of the FIG. 14 embodiment;

FIG. 16 illustrates another exemplary matrix of the FIG. 14 embodiment;

FIG. 19 illustrates an exemplary matrix of an exemplary TA application;

FIG. 20 illustrates an exemplary matrix related to demonstrating an advantage of an exemplary embodiment;

FIG. 21 illustrates an exemplary matrix of the FIG. 19 embodiment;

FIG. 22 illustrates another exemplary matrix of the FIG. 19 embodiment;

FIG. 23 illustrates another exemplary matrix of the FIG. 19 embodiment;

FIG. 24 illustrates exemplary matrices of a preferred embodiment where importance of sign patterns is demonstrated;

FIG. 25 illustrates exemplary matrices of a preferred embodiment;

FIG. 26 illustrates an exemplary QLSS matrix in accordance with an exemplary embodiment;

FIG. 27 illustrates exemplary matrices of an exemplary TA approach;

FIG. 28 illustrates an exemplary matrix of an exemplary TA approach;

FIG. 29 illustrates exemplary matrices in accordance with an exemplary embodiment;

FIG. 30 illustrates an exemplary matrix of the FIG. 29 embodiment where an exemplary TA approach is employed;

FIG. 31 further illustrates the exemplary TA approach of the FIG. 30 embodiment;

FIG. 32 illustrates an exemplary matrix related to demonstrating an advantage of an exemplary embodiment;

FIG. 33 also illustrates an exemplary matrix related to demonstrating an advantage of an exemplary embodiment;

FIG. 34 also illustrates an exemplary matrix related to demonstrating an advantage of an exemplary embodiment;

FIG. 35 illustrates an exemplary matrix in accordance with an exemplary TA approach related to flight system control;

FIG. 36 illustrates an exemplary matrix of the FIG. 35 embodiment;

FIG. 37 illustrates exemplary logic demonstrating an advantage of the FIG. 35 exemplary embodiment;

FIG. 38 illustrates exemplary TASNRP matrices of the FIG. 35 embodiment;

FIG. 39 illustrates exemplary matrices of the FIG. 35 embodiment;

FIG. 40 illustrates other exemplary matrices of the FIG. 35 embodiment;

FIG. 41 illustrates another exemplary matrix of the FIG. 35 embodiment;

FIG. 42 illustrates other exemplary matrices of the FIG. 35 embodiment;

FIG. 43 illustrates yet another exemplary matrix of the FIG. 35 embodiment; and

FIG. 44 illustrates yet another exemplary matrix of the FIG. 35 embodiment.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein may be made without departing from the scope and spirit of the present invention. In addition, descriptions of well-known functions and constructions are omitted for clarity and conciseness.

Figure 1:
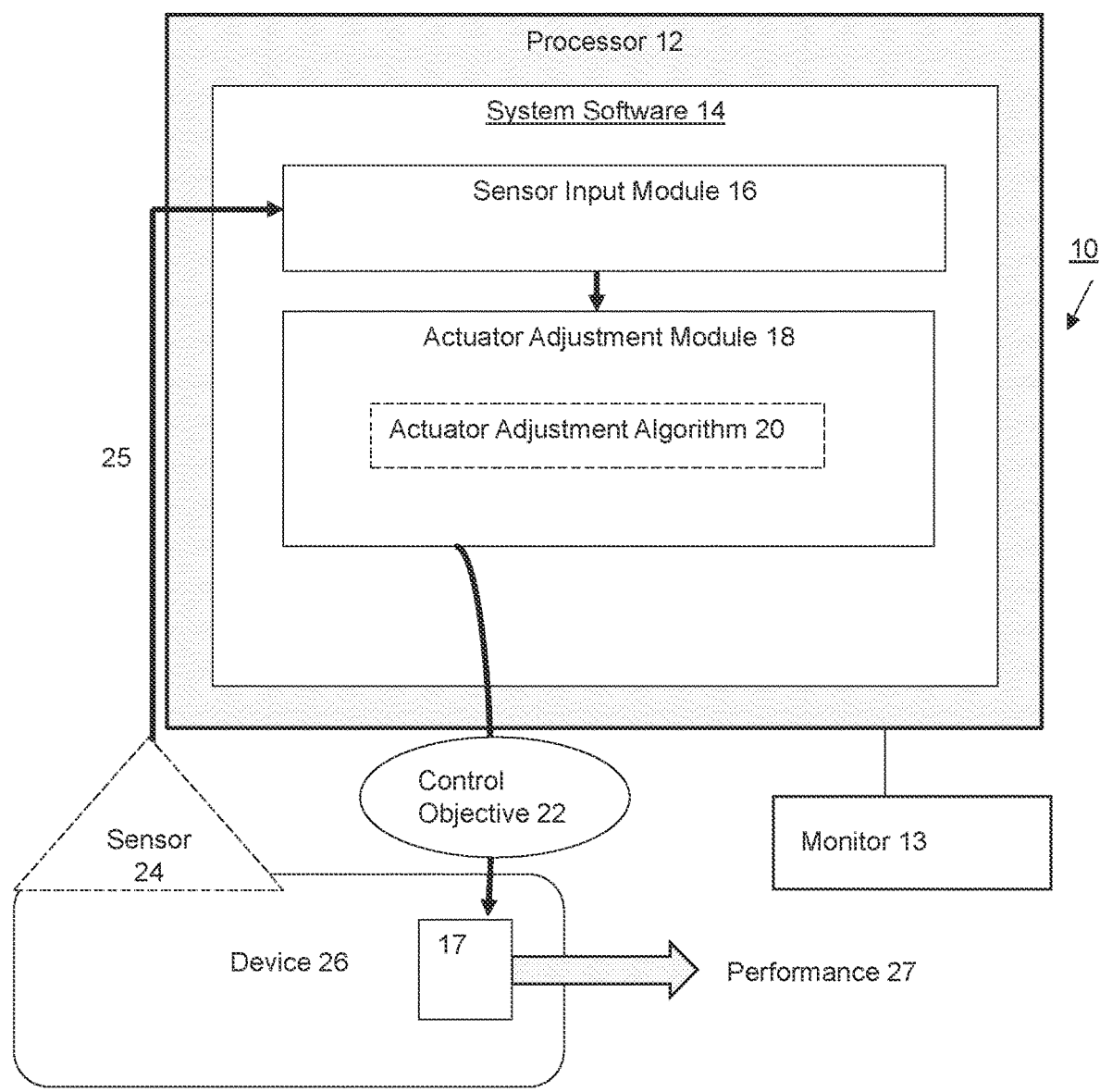
FIG. 1 illustrates an exemplary system in accordance with an exemplary embodiment of the present invention.

Referring initially to FIGS. 1, an exemplary system 10 for implementing control of a device 26 is shown. The exemplary system 10 may comprise a monitor 13 (e.g., comprising a display). It will be apparent to one of ordinary skill in the art that aspects of an exemplary embodiment may be communicated and/or displayed to system users and/or administrators by way of any number of different computer readable mediums without departing from the scope of the present invention. Aspects of the exemplary system 10 may be implemented according to one or more exemplary software modules (e.g., system software 14) of one or more processors (e.g., processor 12). Exemplary software instructions of the system software 14 may be executed by the processor 12. An actuator 17 of the device 26 may be configured to adjust performance (27), positioning, some combination thereof, or the like of the device 26 based on, e.g., feedback reflecting instability control predicted by the processor 12 (e.g., feedback may account for one or more control objectives 22). Action of the actuator 17 may be regulated by the actuator adjustment module 18.

Sensor input information from the device 26 may be communicated 25 from a sensor 24 configured to register information about the device 26 and electronically transmit said information to the system software 14. A sensor input module 16 of the system software 14 may be configured to receive said information, and input said information into an actuator adjustment module 18 comprising one or more actuator adjustment algorithms (e.g., 20). The system software 14 may be configured to communicate a control objective 22 to the device 26 based on results of the one or more actuator adjustment algorithms (e.g., 20). The control objective 22 may provide for improved performance 27 of the device 26. The device 26 may include by way of example and not limitation, a lower complexity device (e.g., washers, dryers, home heating systems, home cooling systems, some combination thereof, or the like) and/or a higher complexity device (e.g., robotic surgery devices, devices for satellite formation flying, commercial and military aircraft autopilot functioning devices, aircraft turbine engine control devices, hypersonic flight vehicle control devices, spacecraft and/or satellite altitude control devices, some combination thereof, or the like).

An exemplary embodiment (e.g., 10) may provide robust control of relevant devices (e.g., 26), wherein a control system of the device may be capable of withstanding any number of different perturbations. By way of example and not limitation, an exemplary aircraft control system optimized by one or more exemplary actuator adjustment algorithms (e.g., 20) and/or exemplary control objectives (e.g., 22) may permit an aircraft to safely adapt to significant air turbulence. The processor 12 may be implemented in and/or physically connected to the device 26 itself, although such is not necessarily required. It will be apparent to one of ordinary skill in the art that control system implementation (e.g., 10) and subsequent control system functioning may be executed and/or regulated by the same or different processors without departing from the scope of the present invention.

It will also be apparent to one of ordinary skill in the art that there may be any number of different methods employed for physically arranging components of an exemplary system (e.g., 10) without necessarily departing from the scope of the present invention. It will further be apparent to one of ordinary skill in the art that exemplary embodiments may be beneficial for control system implementation relevant to any number of disciplines, including by way of example and not limitation, aerospace engineering, automotive engineering, robotics engineering, microgrid stability engineering, providing electrical energy and power systems, and the like. Exemplary embodiments may improve both functioning of any number of different technologies as well as various laboratory and industrial processes related to said technologies. It will further be apparent to one of ordinary skill in the art that the names and organization of modules and algorithms described herein are merely illustrative, and are in no way exhaustive of the scope of the present invention.

Software (e.g., 14) for an exemplary system (e.g., 10) and its corresponding method may be implemented using MATLAB, JAVA, CGI script, Python, some combination thereof, or the like. Exemplary software 14 may be stored on an electronic storage medium, and may be executed with the cooperation of a controller and memory. Any number of different computing devices may be employed to execute exemplary software 14. Computing devices, preferably adapted to run programming code and implement various instructions and/or functions of the software 14, may include by way of example and not limitation, processors, microprocessors, microcontrollers, embedded processors, DSP, some combination thereof, or the like. It will be apparent to one of ordinary skill in the art that any number of different computing and/or display devices may be employed without departing from the scope of the present invention. System software 14 may further provide graphical simulation for control system analysis and design. System software 14 may comprise both frequency domain and time domain controller design methods. Uncertainty in the form of real parameter variations may be accounted for by the system software 14. Exemplary GUI may significantly reduce the time required for analysis, design and/or simulation of an exemplary control system.

Referring now to FIGS. 2-11, certain current practice control system techniques operate under the assumptions that (1) a real matrix A is state variable convergent if and only if the eigenvalues of A have negative real parts (where the eigenvalues of a real nth order square matrix A are obtained as roots of the matrix's weighted Characteristic Polynomial given by $(-1)^n Det(\lambda I-A)=0$ (referred to as "Routh-Hurwitz Characteristic Polynomial" or "RHCP"); (2) where real matrices A, $A_{el}$, $A_{er}$, and CMPA all share the same RHCP, the eigenvalues of A, $A_{el}$, $A_{er}$, and CMPA are each the same, and the eigenvalues of real matrix A are invariant under any non-singular transformation, labeled as "similarity transformations," (this may be referred to as the "Eigenvalue Invariance Phenomenon" or "EIV"); and (3) a necessary condition for state variable convergence of a real matrix A is that all real coefficients $c_{i_a}$ (i=1, 2, 3 ... n) of an nth degree RHCP be positive. FIGS. 2-11 provide exemplary logic indicating that aforementioned assumption (2) is not valid for any arbitrary, non-singular similarity transformation matrix used, nor is it valid for any arbitrary order of the matrix A, and aforementioned assumption (3) is inaccurate. Negativity of the real parts of eigenvalues of a real matrix A is neither a necessary condition nor a sufficient condition for the all linear combination state variable convergence of the system because eigenvalues are herein established to be unsuitable for assessing actual all linear combination state variable convergence of a real matrix going through transformations. Exemplary actuator adjustment algorithms described in more detail below may reflect said indications of the FIGS. 2-11 exemplary logic, and may provide improved testing of state variable convergence of real matrices.

Referring to FIGS. 2-5, exemplary logic is shown for demonstrating eigenvalues are not invariant under all possible non-singular transformations. Referring specifically to FIG. 2, a 6th order matrix 28 including eigenvalues of D1 is shown (e.g., obtained by MATLAB command eig(D1), which may provide eigenvalues of D1 as 6 real numbers with −0.5 repeated 6 times) (another way to obtain eigenvalues of D1 may include the formation of a Jordan matrix using MATLAB command [PD1, JD1]=jordan(D1)). Referring specifically to FIG. 3, a companion matrix 30 corresponding to FIG. 2 is shown, wherein the companion matrix 30 may be obtained using a MATLAB Poly(D1) command. Said command may return coefficients of an RHCP of the D1 matrix as follows:

[1 3 3.75 2.5 0.9375 0.1875 0.0156]

Said coefficients may be applied to the companion matrix 30, and eigenvalues of CMP6D1 32 may be obtained, wherein eigenvalues of CMP6D1 32 are different from eigenvalues of D1 (an example of "Eigenvalue Invariance Failure" or "EIF" or "EIV Failure").

Referring specifically to FIGS. 2 and 4, a TASS matrix 34 having a different elemental structure (both in magnitudes and signs) with respect to matrix D1 (28) is shown. Here, matrix 34 has the same RHCP as the matrix D1 (28). By way of example and not limitation, where a Poly(TASS) command is applied (e.g., in MATLAB) to obtain the RHCP for matrix 34, the exact same RHCP as that of the matrix D1 (28) is obtained. RCHP of the TASS matrix 34 is shown by coefficients 36 in the FIG. 4 example, where said coefficients 36 are identical to the above coefficients of the RCHP of the D1 matrix (even though here, D1 matrix's (28) elemental sign and magnitude structure is significantly different from that of matrix TASS 34). Referring specifically to FIG. 5, matrices 38 shown include a transformation matrix PTASS and a Jordan matrix JTASS, each of which are real matrices. Referring now to FIGS. 2 and 4-5, although the D1 (28) and TASS (34) matrices shared the same RHCP, their corresponding PTASS (function of elements of TASS matrix) and JTASS (having 3 mini-Jordan blocks suggesting geometric multiplicity q=3) are dissimilar (another example of Eigenvalue Invariance Failure). Here, EIF between seemingly similar matrices may be related to omission of important input criteria, disregard for sign patterns within considered matrices, some combination thereof, or the like.

FIGS. 6-7 show exemplary logic demonstrating EIF and/or Eigenvalue Invariance Holding ("EIH") may depend on magnitudes of an original given matrix A. Referring specifically to FIG. 6, a 6th order matrix 40 including eigenvalues of A1 is shown (e.g., obtained by MATLAB command eig(A1), which may provide eigenvalues of A1 as 6 real numbers with −⅙ repeated 6 times) (another way to obtain eigenvalues of A1 may include the formation of a Jordan matrix using MATLAB command [PA1, JA1]=jordan(A1)). Here, both the transformation matrix PA1 and the jordan matrix JA1 are real matrices not reproduced from space considerations. Referring specifically to FIG. 7, a companion matrix 42 corresponding to FIG. 6 is shown, wherein the companion matrix 30 may be obtained using a MATLAB Poly(A1) command. Said command may return coefficients of an RHCP of the A1 matrix as follows:

[1 1 0.4167 0.0926 0.0116 0.0008 2.1422e-05]

Said coefficients may be applied to the companion matrix 42, and eigenvalues of CMP6A1 44 may be obtained, wherein eigenvalues of CMP6A1 44 are different from eigenvalues of A1 (an example of EIF).

FIG. 8 shows exemplary logic related to reasons for the aforementioned EIF, and demonstrates relevance of magnitudes, signs and locations of entries of an original given matrix A. Here, a 6th order matrix 46 including eigenvalues of D1 Nis shown. Here, the matrix D1N (46) is a pure diagonal matrix, where eigenvalues of D1N are −⅙ repeated 6 times (another way to obtain eigenvalues of D1 N may include the formation of a Jordan matrix using MATLAB command [PD1 N, JD1 N]=jordan(D1 N)). Here, both the transformation matrix PD1 N and the jordan matrix JD1 N are real matrices with the magnitude −⅙ repeated 6 times.

The transformation matrix PD1N may simply be a 6th order matrix, and the jordan matrix JD1 N may be a pure diagonal matrix. A companion matrix corresponding to FIG. 8 may be obtained using a MATLAB Poly(D1 N) command. Said command may return coefficients of an RHCP of the D1 N matrix as follows:

[1 1 0.4167 0.0926 0.0116 0.0008 2.1422e-05]

Said coefficients may be applied to the companion matrix, and eigenvalues of CMP6D1 N may be obtained, wherein eigenvalues of CMP6D1 N are −⅙ repeated 6 times (the same eigenvalues of D1 N 46). EIV holds in the aforementioned example, and whether EIV holds or fails in other examples may be a function of the elemental structure of a given matrix.

Byway of example and not limitation, where RHCP of the CMP6D1 N matrix is as follows:

[1 1 0.4167 0.0926 0.0116 0.0008 2.1433e-05]

and where RHCP of the CMP6A1 matrix is identical (though matrix A1 has a completely different elemental sign and magnitude structure than that of matrix D1 N, even though they both share the same RHCP), EIV holds for the pair of D1 N and CMP6D1 N together, but EIV fails for the pair A1 and CMP6A1 together. The aforementioned failure occurs in spite of the fact the CMP6D1 N matrix is identical to that of CMP6A1 (though the A1 matrix's elemental sign and magnitude structure is considerably different from the elemental sign and magnitude structure of D1 N). This underscores the importance of providing improved control system algorithms that appreciate EIV phenomenon is indeed a function of the magnitudes, signs and locations of entries of an original given matrix.

FIGS. 9-10 further illustrates that EIV failure is a function of magnitudes of a matrix. In FIG. 9, a 6th order matrix 48 including eigenvalues of A2 is shown. Matrix values here are modified slightly with respect to the FIG. 6 example, and unlike the FIG. 6 example, in FIG. 9, the 3 main diagonal elements are of the same magnitude as main anti-diagonal ("MANTD") elements. Eigenvalues of A2 may be obtained using MATLAB command eig(A2), which may provide values as 3 complex conjugate pairs as follows:

−0.0833±j0.1443
−0.0833±j0.1443
−0.0833±j0.1443

Another way to obtain eigenvalues of D1 N may include the formation of a Jordan matrix using MATLAB command [PA2, JA2]=jordan(A2). Here, the transformation matrix PA2 is actually a complex matrix (labeled as $\mathscr{F}$A2), and the Jordan matrix JA2 is also a complex matrix (labeled as $\mathscr{F}$A2). Here, the $\mathscr{F}$A2 matrix is a pure diagonal Jordan matrix with its diagonals having the aforementioned complex eigenvalues. Referring to FIG. 10, a companion matrix 50 corresponding to FIG. 9 may be obtained using a MATLAB Poly(A2) command. Said command may return coefficients of an RHCP of the A2 matrix as follows:

[1 0.5 0.1667 0.0324 0.0046 0.0004 2.4133e-05]

Here, when eig(CMP6A2) is computed, the following eigenvalues may be obtained:

−0.1076±j0.1857
−0.0382±j0.1507
−0.1042±j0.0916

The example of FIGS. 9-10 demonstrates clear EIV failure. Based on the forgoing, eigenvalues may be unsuitable as sole measures of state variable convergence of a real matrix.

One additional reason for the unsuitability of eigenvalues as sole measures of state variable convergence of a real matrix includes that for some matrices, the diagonal elements (which are always real in a real matrix) serve as the eigenvalues of the matrix, but for other matrices having a different elemental structure, computation thereof is highly coupled to the signs and magnitudes within the matrix (for them, eigenvalues may be either all complex conjugate pairs, or all reals, or a mix of complex conjugates and reals). Another reason for the unsuitability of eigenvalues as sole measures of state variable convergence of a real matrix includes that an assumption made in Cayley-Hamilton Theorem that $A^0=I_n$ is not entirely accurate. Referring to FIG. 11, in an exemplary embodiment, $A^0$ is taken as either an XI matrix or as a Un matrix (e.g., 52). With the notation $A^0=XI$, the XI matrix may be labeled as such to represent a combination of a main diagonal identity matrix and a MANTD identity matrix. The Un matrix may be labeled as such to represent a Unity matrix with numeral 1 in all elements.

Referring now to FIG. 12, certain current practice control system techniques operate under the assumptions that the matrix $e^{At}$ is a proper State Transition Matrix (STM) for a Linear Time Invariant State Space (LTISS) system. However, the aforementioned assumption is not entirely accurate. Where only an LTI State Space matrix, on its own, is considered, with no concern for its connection to a transfer function, then the aforementioned exponential matrix may not be the STM for that LTISS system, because polynomial root testing does not directly translate to testing the eigenvalues of a matrix. Furthermore, using the exponential matrix as the STM for LTISS systems prevents convexity in the state variable convergence of the given real matrix. An exemplary Transformation Allergic (TA) approach may better find the appropriate STM for LTISS systems. An exemplary TA approach may clearly distinguish between regular state variable convergent matrices and Convexly Hurwitz stable matrices. TA conditions may be a function of the order of the matrix.

FIG. 12 illustrates the importance of sign patterns with respect to state variable convergence of a real matrix (demonstrates that current practice transformation compliance ("TC") methods, which do not consider the effect of all possible sign patterns within the matrix, have significant limitations). Here, the matrix 54 (1), considered with the matrixes Z and $Z^T$, where a permutation matrix P is shown as 54 (2), may be combined into a new matrix, $A_{el}=Z^{-1}AZ$, which is shown as 54 (3). Simultaneous permutation here may be permitted since orthogonal $Z^T=Z^{-1}$. With similarity transformation methods, the matrices A and $A_{el}$ may be similar matrices in the sense that both have the same eigenvalues. However, for similar matrices, only A and $A_{el}$ may be looked at, not necessarily A and $A_{er}$. The matrices A, $A_{el}$ and $A_{er}$ are each completely different matrices, and may comprise separate elemental structures. A number of issues may occur when using known similarity transformation methods. Furthermore, known TC methods may be insufficient for achieving convex stability. Additionally, known TC methods may suffer from the EIV phenomenon and may be sight pattern blind (never take the sign patterns of the state space dynamics matrix into consideration when deriving TC conditions).

Referring back to FIG. 1, an exemplary actuator adjustment algorithm 20 may not require accounting for an invisible Ae matrix. An exemplary TA approach (e.g., reflected in one or more exemplary actuator adjustment algorithms 20) may include accounting for behavior of a dependent variable 6 over time (t). An exemplary TA approach may account for the unlikeliness that negativity of a real parts of the eigenvalues of a real matrix A may be a necessary condition for the state variable convergence of a real matrix A for all of its possible $3^{n^2}$ sign patterns. An exemplary TA approach may involve using indices (labeled as stability definiteness indices or "SDIs") to determine state variable convergence of a real matrix as opposed to using eigenvalues of a matrix. The exemplary TA approach described herein avoids certain major drawbacks of eigenvalue computation, namely that eigenvalue computation is time consuming and expensive. With the exemplary TA approach, far less computational power is required by taking out eigenvalue computation, and rather using novel, non-eigenvalue indices.

The exemplary TA approach described herein deviates significantly in a conceptual way from the current practice TC philosophy, which is based on determinant-based eigenvalue methods. The exemplary TA approach appreciates a fundamental philosophical difference between said TA approach and the current practice TC philosophy. The current practice TC philosophy is based on the use of numerically sensitive eigenvalue usage for determining state variable convergence (stability) of a real matrix, whereas the exemplary TA approach does not depend on the use of determinant based eigenvalues. In other words, with the exemplary TA approach described herein, it is the matrix elemental sign and magnitude structure that plays a crucial role in deciding the ALCSVC (TA stability) property, as opposed to eigenvalue behavior of the matrix.

Referring now to FIG. 13-44, exemplary logic for various aspects of certain exemplary embodiments are shown. The exemplary logic may reflect exemplary actuator adjustment algorithms for providing exemplary control objectives aimed at improving performance of a device. It will be apparent to one of ordinary skill in the art that exemplary embodiments described herein may be applicable in any number of different aerospace engineering applications, including by way of example and not limitation, satellite altitude control, helicopter dynamics and control, missile dynamics and control, quadcopter dynamics and control, and the like. Although exemplary embodiments described herein are often described with reference to aircraft or spacecraft control, it will be apparent to one of ordinary skill in the art that implementations and embodiments of the present invention are not limited thereto, and the present invention may be applicable to any number of different technical areas involving control systems.

Referring specifically to FIG. 13, an exemplary actuator adjustment algorithm may include all linear combination state variable convergence ("ALCSVC") of any zero-state equivalent linear time invariant state space ("ZSELTISS"). Unlike known Hurwitz Stability analysis, with an exemplary ALCSVC algorithm, state variable convergence does not require eigenvalues of a matrix A to have negative real parts, where the eigenvalues of a real nth order square matrix A are obtained as the roots of the matrix's (weighted) Characteristic Polynomial given by the following:

$$(-1)^n \text{Det}(\lambda 1 - A) = 0$$

An exemplary TA approach deviates significantly from known TC approaches, which rely significantly on determinant-based eigenvalue methods (e.g., eigenvalues may be used for determining Hurwitz stability of a real matrix with known TC approaches). In contrast, an exemplary TA approach does not depend on the use of determinant based eigenvalues, but rather is based on the use of sign patterns within a given real matrix.

With an exemplary TA approach, an entire negative real part eigenvalue property may be based on sign patterns within a given real matrix, with no need for the use of magnitudes. An exemplary TA approach does not require compliance with TC conditions of Hurwitz stability. In an exemplary embodiment, the product of off-diagonal elements of the form $a_{ij}a_{ji}$ connecting only two distinct nodes (indices) are referred to as "I-cycles". Since the product may form a cycle of indices, products $a_{12}a_{21}$ and $a_{21}a_{12}$ may be considered to be the same. All I-cycle products which are positive may be referred to as Same Sign (SS) links. SS links formed by the product of two positive $a_{ij}$ may be labeled as $SS_{pp}$ links. SS links formed by the product of two negative $a_{ij}$ may be labeled as $SS_{nn}$ links. Here, $SS_{pp}$ (also referred to as "mutualism") stands for Same Sign link where that same sign is positive. Similarly, $SS_{nn}$ (also referred to as "competition") link stands for Same Sign link where that same sign is negative. Both $a_{ij}$ and $a_{ji}$ being zero may be denoted as $SS_{00}$ link.

In the case of a Skew-Symmetric matrix (where all diagonals are zero and there are equal magnitudes in off-diagonal elements), based on signs of off-diagonal terms, the cyclic product (e.g., $a_{14}$ or $a_{41}$) may always be negative (occurring when one of the elements (either $a_{14}$ or $a_{41}$) is positive and the other is negative). The aforementioned link may be referred to as the OS link (Opposite Sign link). A skew-symmetric matrix may have only OS links, only $SS_{00}$ links, or a combination of both. All cyclic products having a zero product may be labeled as Zero Sign (ZS) links. Within ZS links, just as in SS links, the (+, 0) link may be denoted as the Z $S_{p0}$ (ammensalism) link and (−, 0) link may be denoted as the Z $S_{n0}$ (commensalism) link. Cyclic products (I-cycles) may be referred to as "interactions" (in the case of three or more nodes being connected, the nodes/indices may be referred to as k-cycles).

A ZS link in an original given matrix may become either an $SS_{pp}$ link or an $SS_{nn}$ link in a symmetric matrix therefor ($A_{sym}$). Thus, the Asym matrix may eventually have only $SS_{00}$ links, only $SS_{pp}$ links, only $SS_{nn}$ links, or a combination thereof. ZS links (in the original matrix) may thus be disconnected with the OS links because of their relationship to only the symmetric part of the matrix, but not to the skew-symmetric part of the matrix. Referring to exemplary Qualitatively Sign Stable ("QLSS") matrices, a significant advantage thereof includes an ability to enter arbitrary magnitudes in non-zero signed entries, and the presence of negative real part eigenvalues for any arbitrary magnitude. Thus, an exemplary QLSS is magnitude independent, and rather is sign dependent, permitting the exemplary QLSS to provide robust control with respect to various engineering systems. An exemplary QLSS may ensure all linear combination state variable convergence ("ALCSVC") occurs. FIG. 13 illustrates exemplary sign matrices 56 of exemplary 4th order QLSS matrices. Here, a linear, non-singular transformation matrix Z may have the property that $Z^{-1}=Z^T$ ($Z_{qlss}=Z_{orthog}$).

A negative real part and a corresponding imaginary part may depend on quantitative data being used in an exemplary quantitative QLSS matrix, but the QLSS matrix having negative real part eigenvalues may be the result of sign patterns within the matrix, as opposed to the magnitudes of the entries of the matrix. Thus, the route of employing polynomial roots for satisfying the Routh-Hurwitz conditions of Hurwitz stability is not a necessary route for a given real square sign matrix to possess negative real part eigenvalues. Sign patterns may permit this as opposed to magnitudes. Thus, here, it is not necessary to even compute the eigenvalues of a real matrix to establish that the given real matrix has negative real part eigenvalues. Accordingly, there may be no need to form a Companion matrix at all. It may be concluded that the matrix includes negative real part eigenvalues by simply examining the sign pattern of the matrix. An exemplary TA approach may combine an exemplary QLSS approach with the TC approach to ensure the convergence of all state variables under all possible non-singular transformations.

With an exemplary TA approach, negativity of the real parts of eigenvalues may become unnecessary for the convergence of all state variables that happen under linear and nonlinear non-singular transformations. Here, ALCSVC implies Hurwitz stability (though Hurwitz stability does not imply ALCSVC), providing a major advantage thereof with respect to traditional TC methods. In one exemplary TA approach, where every real matrix A of order n has a possible $3^{n^2}$ sign patterns (with 0+ and − signs), the trace of any 4th order real square matrix A may be given by the sum of diagonal elements thereof:

$$a_{11}+a_{22}+a_{33}+a_{44}=-\beta \quad \beta \geq 0$$

The above trace value, rather than being viewed as a sum of individual diagonal elements, may viewed as a sum of new indices, labeled as Adjacent Repeated Diagonal Mini-Traces ("ARDMTs"). ARDMTs may be provided in terms of original diagonal elements as follows:

$$a_{11}+a_{22}+a_{33}+a_{44}=(a_{11}+a_{44})/2+(a_{11}+a_{44})/2+(a_{22}+a_{33})/2+(a_{22}+a_{33})/2$$

The indices $(a_{11}+a_{44})/2$ and $(a_{22}+a_{33})/2$ may be designated as ARDMTs (Adjacent Repeated Diagonal Mini-Traces) (here, the diagonal elements all and $a_{44}$ are treated as adjacent). With an exemplary TA approach, the ARDMTs may be represented in a repeated diagonal format. Accordingly, in a given 4th order real matrix, TAIs (transformation allergic index) (e.g., each ARDMT is a TAI) may be defined as follows:

$$TAI_1=(a_{11}+a_{44})/2$$

$$TAI_2=(a_{22}+a_{33})/2$$

With the Main Diagonal element sum expressed as the sum of ARDMTs, there may be no obligation in an exemplary TA approach to treat the trace of a real matrix (e.g., 4th order A matrix) to follow a rule that Trace of A must be equal to the sum of the eigenvalues. In an exemplary TA approach, computing the eigenvalues $\lambda_i$ of the A matrix is not required. Rather, TAIs may be observed, and the total full trace may be considered as the sum of multiple TAIs. Thus, an exemplary TA approach may focus on trace as opposed to focusing on the relationship between determinant and trace. Thus, an exemplary TA approach may not be affected by whether a determinant is singular or negative. TAIs becoming zero may be treated as instability in the given LTISS system, as opposed to a determinant becoming zero criterion being treated as instability.

An exemplary matrix with negative TAIs may still have convergence among its state variables when said variables satisfy proposed TA conditions. TAIs being negative may be a necessary condition for ALCSVC. Computation of additional indices labeled Stability Definite Indices ("SDI") may promote sufficiency of ALCSVC. Indices, TAIs, and SDIs may collectively be applied to final exemplary TA conditions for ALCSVC of an LTISS system. In one example embodiment, a Trace expression as follows may be provided:

$$a_{11}+a_{22}+a_{33}+a_{44}=\text{FullTrace of } A=-\beta \quad (\beta \geq 0)$$

Here, β denotes the absolute value (magnitude) of the Full Trace. Diagonal elements of the real matrix A may still be shared by a symmetric part of the matrix, $A_{sym}$. Real eigenvalues of $A_{sym}$ may be denoted as $\lambda_{Rs1}$, $\lambda_{Rs2}$, $\lambda_{Rs3}$, and $\lambda_{Rs4}$. The following may be provided accordingly:

$$(\lambda_{Rs1}+\lambda_{Rs4})/2+(\lambda_{Rs1}+\lambda_{Rs4})/2+(\lambda_{Rs2}+\lambda_{Rs3})/2+(\lambda_{Rs2}+\lambda_{Rs3})/2$$

The aforementioned sum may add up to the full trace −β. Two additional indices for Stability Definite Index with SS links ("SDISS") may be provided as follows:

$$SDISS_1=(\lambda_{Rs1}+\lambda_{Rs4})/2$$

$$SDISS_2=(\lambda_{Rs2}+\lambda_{Rs3})/2$$

In an exemplary embodiment where TAIs deal only with the main diagonal of the matrix, and SDISSs are governed by $A_{sym}=(A+A^T)/2$, the following indices may be provided (where $\beta \geq 0$):

$$ModTAI_1+ModTAI_2=\beta/2$$

$$ModSDISS_1+ModDISS_2=\beta$$

Additional indices may include SDIOS indices, which may be motivated by the skew-symmetric part of the real matrix A, denoted by $A_{sksym}=(A-A^T)/2$. Maximum absolute imaginary parts with complex conjugate pair eigenvalues of the $A_{skysym}$ matrix may be indicators of excessive overshoot.

Figure 14:
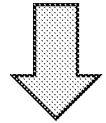
FIG. 14 illustrates exemplary logic for an exemplary TA approach.

Generally speaking, an exemplary TA approach may establish that measures such as TAIs, SDISSs, overshoot limited convergence index (OLCI) (described in more detail below), some combination thereof, or the like provide non-eigenvalue measures for determining ALCSVC of an LTISS system. Referring to FIG. 14, an exemplary TA approach may include an A matrix 58 with TAIs formed therefor shown. Here, $TAI_1=TAI_2$ and both are negative. SDISSs may be computed 59 based on the TAI data, and $A_{sym}$ 60 and $A_{skysm}$ 62 matrices are generated accordingly. Referring now to FIGS. 14-15, the $A_{sym}$ 60 matrix may be relabeled as $A_{symtc}$, which may be treated as $A_{augsymta}$ (augmented system matrix from TA point of view) to rewrite the $A_{sym}$ 60 matrix as matrix 64. Real eigenvalues may be denoted as $\lambda_{augRs1}$ and $\lambda_{augRs4}$, where $\lambda_{augRs1}$ may equal −0.8246 and $\lambda_{augRs4}$ may equal 0.7934 (e.g., so that $SDISS_1$=−0.03125). Furthermore, $\lambda_{augRs2}$ may equal −0.3246 and $\lambda_{augRs3}$ may equal 0.2934 (e.g., so that $SDISS_2$=−0.03125). In the aforementioned illustrative example, $SDISS_1=SDISS_2$, and both are negative. An OLCI may be computed based on exemplary logic 66 illustrated in FIG. 16, where eigenvalues are as follows:

−0.0000±0.8090

0.0000±0.3090

In an exemplary embodiment, OLCI may be considered to be equal to the positive eigenvalue.

Figure 17:
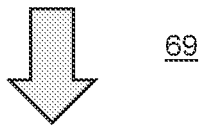
FIG. 17 illustrates an exemplary LTISS system matrix.

Referring now to FIG. 17, an exemplary LTISS system matrix 68 is shown, the matrix 68 combining $SS_{00}$ links and a set of $ZS_{p0}$ links where the magnitude of the positive elements thereof are Unity (numeral 1). TAIs may be formed accordingly, and SDIs may be computed 69 thereafter. Based on the SDIs, $A_{symtc}$ 70 and $A_{skysmtc}$ 72 matrices may be generated. $A_{symtc}$ 70 may be treated as $A_{augsymta}$ and $A_{skysmtc}$ 72 may be treated as $\lambda_{augsksymta}$. Computing $A_{augsymta}$ real eigenvalues, $\lambda_{augRs1}$ may equal −17.6121 and $\lambda_{augRs4}$ may equal 12.3972 (e.g., so that $SDISS_1$=−5.2148). Computing $\lambda_{augsksymta}$ real eigenvalues, $\lambda_{augRs2}$ may equal −4.9174 and $\lambda_{augRs3}$ may equal 4.8623 (e.g., so that $SDISS_2$=−0.0551). Pure imaginary pair eigenvalues of the $\lambda_{augsksymta}$ matrix may be as follows:

0.0000±4.9040

0.0000±15.0284

Figure 18:
FIG. 18 illustrates another exemplary LTISS system matrix.

Referring now to FIG. 18, another exemplary LTISS system matrix 74 is shown. TAIs may be formed based off of matrix 74 data, and SDIs may be computed 75 thereafter. Based on the SDIs, $A_{symtc}$ 76 and $A_{skysmtc}$ 78 matrices may be generated. $A_{symtc}$ 76 may be treated as $A_{augsymta}$ and $A_{skysmtc}$ 78 may be treated as $\lambda_{augsksymta}$. Computing $A_{augsymta}$ real eigenvalues, $\lambda_{augRs1}$ may equal −7.1453 and $\lambda_{augRs4}$ may equal 5.6578 (e.g., so that $SDISS_1=-1.4875$). Computing $\lambda_{augsksymta}$ real eigenvalues, $\lambda_{augRs2}$ may equal −3.9815 and $\lambda_{augRs3}$ may equal −1.1019 (e.g., so that $SDISS_2=-5.0834$). Pure imaginary pair eigenvalues of the $A_{augsksymta}$ matrix may be as follows:

$\lambda_{ccpsk1n}=-0000\pm6.4143i$ $\lambda_{ccpsk2p}=-0.000+0.000i$ $\lambda_{ccpsk2p}=0.00+0.000i$ The forgoing demonstrates conditions for ALCSVC may be determined without forming a characteristic polynomial and without calculating eigenvalues. It will be apparent to one of ordinary skill in the art that one or more exemplary TA algorithms may be incorporated into an exemplary system for implementing control systems for promoting safe and effective control of any number of different technologies.

Referring generally to illustrative example TC and exemplary TA applications in FIGS. 19-23, $A_{eleft}=ZAZ^{-1}$ and $A_{eright}=Z^{-1}AZ$, and an assumption is made that $A_{eleft}\neq A_{eright}$ (matrices may have drastically different elemental structures both in signs and magnitudes of their elements, which may affect LTISS system plant matrices). FIGS. 19-23 demonstrate eigenvalues are not invariant under all possible arbitrary, real, non-singular linear transformations. Referring specifically to FIG. 19, a 5th order matrix 80 with nonzero diagonal elements is shown. The FIG. 19 example may represent an algebraically equivalent linear time invariant state space ("AELTISS") system per TC methods. A positive scalar a may be provides as $a=1/(5^5)=3.2e-04$. A TC approach may include providing eigenvalues of A as −a, −a, −a, −a, −a. An exemplary TA approach may assign the five scalars shown in matrix 80 as definiteness indicators as opposed to eigenvalues. Where another positive scalar b=4444 is introduced, a real, non-singular linear transformation matrix Z may be given by exemplary matrix 82. Where $A_{eleft}=ZAZ^{-1}$, computing the linear, real, transformed matrix, an exemplary real matrix may be generated, and eigenvalues may be as follows:

Eigenvalues of $A_{eleft}$ are
+0.0006+j0.0000
−0.0000+j0.0009
−0.0000−j0.0009
−0.0011+j0.0006
−0.0011−j0.0006
Computing the eigenvalues of $A_{eright}=Z^{-1}*A*Z$ we get its eigenvalues to be:
Eigenvalues of $A_{eright}$ are
1.0e-03*
+0.3751+j0.0000
−0.1056+j0.6610
−0.1056−j0.6610
−0.8820+j0.4081
−0.8820−j0.4081
Here, it is apparent the eigenvalues generated from an exemplary TA approach are significantly different from eigenvalues of A provided from a T approach.

Referring specifically to FIG. 20, a Jordan matrix may be generated for the given A matrix of the FIG. 19 embodiment (e.g., based on MATLAB command [PA, JA]=jordan(A). This may provide PA as an identify matrix and JA as the original A matrix. Checking the commutativity constraint (AZ=ZA between the original real State Space matrix and a corresponding linear real transformation matrix operating on it) of a proposed Z matrix may be achieved by computing the products of AZ and ZA. In this particular example, the matrix products are provided in matrices 84. Since the matrix products are dissimilar, the commutativity constraint is not satisfied, thus the T method applied here is inadequate for identification or visualization of real, non-singular, transformation matrices Z that exist but are not visible. Referring specifically to FIG. 21, where a 5th order matrix 86 is shown, from a TC approach, eigenvalues of D are −0.2, −0.2, −0.2, −0.2, −0.2. In contrast, from an exemplary TA approach, the five scalars of FIG. 21 may be evaluated as definiteness indicators as opposed to eigenvalues.

Referring specifically to FIG. 22, matrices 88 shown represent a real, non-singular linear transformation matrix and $D_{eleft}$ values thereof. Eigenvalues may be as follows:
−0.200+j0.0000
−0.200+j0.0000
−0.200−j0.0000
−0.200+j0.0000
−0.200+j0.0000
The above eigenvalues are different from the eigenvalues of matrix 86 in the FIG. 21 example. The above eigenvalues may demonstrate that the eigenvalues may be a mix of repeated and distinct (e.g., here, the eigenvalue with the positive sign zero imaginary part is repeated 4 times while there is a single eigenvalue with a negative sign zero imaginary part, whereas eigenvalues with FIG. 21 are fully real and repeated 5 times). Said mix may demonstrate that a real, linearly transformed matrix's elemental structure may be drastically different (e.g., both in the signs and magnitudes of the elements) from that of an original, un-transformed pure real, diagonal matrix D.

Referring specifically to FIG. 23, matrices 90 shown represent a 5th order matrix with nonzero diagonal elements (e.g., representing an AELTISS system), and a real, non-singular linear transformation matrix, denoted by $Z_{ss}$ (based on assigning positive scalar b=64=1296). $UT_{eleftss}$ may be calculated from $Z_{ss}*UT*Z_{ss}^{-1}$, and eigenvalues of $UT_{eleftss}$ may be as follows:
+1.1999+j1.2057
+1.1999−j1.2057
−1.2055+j1.1982
−1.2055−j1.1982
+0.0106+j0.0000
The above eigenvalues are dissimilar from the eigenvalues of UT illustrated in FIG. 23. The forgoing may further demonstrate a real, linearly transformed matrix's elemental structure is drastically different from that of the original, un-transformed, pure real, matrix A. Exemplary TA approaches do not involve adherence to the traditional eigenvalue invariance property (which does not hold for any arbitrary real, non-singular transformation matrix).

Referring back to FIG. 1, an exemplary actuator adjustment algorithm 20 may incorporate an exemplary TA approach. An exemplary TA approach may include, for example, no pure diagonal matrices (in contrast to TC approaches). An exemplary actuator adjustment algorithm may comprise two sets of matrices (e.g., X shaped matrices, which comprise the Main Diagonal (MD) and a Main-Anti-Diagonal (MANTD) matrices, and Non-X matrices). With an exemplary actuator adjustment algorithm, when a real square matrix A is given, the system software 14 may express the matrix as $A_{tc}$ to differentiate it from the same A matrix, and label the same $A_{tc}$ matrix as $A_{ta}$. An exemplary TA approach may include, as another example, only consideration of X matrices and non-X matrices (in contrast to TC approaches), to, for example, assign equal importance to a main diagonal part as well as a main anti-diagonal part of the X matrix being considered. An exemplary TA approach may include, as yet another example, assigning considerable importance to the sign patterns of all elements within a given matrix (in contrast to TC approaches). FIGS. 24-30 illustrate exemplary matrices (92, 94, 96, 98, 100, 102, 104, 106, 108) of an exemplary TA approach further demonstrating, e.g., the importance of sign pattern.

Referring now to FIGS. 31-34, exemplary control system implementation may involve an exemplary TA approach where conclusions on the ALCSVC may be drawn without forming a Routh Hurwitz Characteristic Polynomial of X matrices (without computing eigenvalues at all). In the FIGS. 31-34 embodiment, convex combination coefficients may be determined using RHCHPA data. The matrix 112 demonstrates D=X1 data, and based on said data, TAIs and SDISSs may be computed as follows:

$TAI_1 = -2.5$
$TAI_2 = -2.5$
$as_{14} = 0$
$as_{23} = 0$
$SDIS_1 = 0$
$SDISS_2 = 0$

In this particular example, since both SDISSs are zero, the matrix 112 may be considered to be TA unstable (lacks an ALCSVC property). Continuing with a procedure for determining convex combination coefficients, it may be observed that for the X1 matrix, RHCHPA coefficients are as follows:

$C_{1a} = 10$
$C_{2a} = 35$
$C_{3a} = 50$
$C_{4a} = 24$

Accordingly, here, $\tau 1=0:08403$; $\tau 2=0:29411$; $\tau 3=0:42016$; and t $\tau 4=0:20168$, where $\tau$ coefficients add up to one, qualifying them to be convex combination coefficients. Computed eigenvalues for comparison are shown in matrix 114 (generated from matrix 110). Matrix 114 demonstrates MIDMT instability and thus blind spot state variable divergence. By carrying out the formation of a transfer function involving blind spot state variables, it may be observed that a required transfer function is either:

$Y(s)/U(s) = N(S)/D(s) = [s^4 + s^3 + \tau_2 s^2 + \tau_3 s + \tau_4]/[s_4 + s_3 + c_{2n} s^2 + c_{3n} s + c_{4n}]$ Or $Y(s)/U(s) = N(S)/D(s) = [s_4 + s_3 + c_{2n} s^2 + c_{3n} s + c_{4n}]/[s^4 + s^3 + \tau_2 s^2 + \tau_3 s + \tau_4]$ In another example embodiment, where another X matrix 116 is considered (e.g., essentially a pure diagonal matrix), TAIs and SDISSs may be computed to provide the following:

$TAI_1 = 0$
$TAI_2 = -0.4$
$as_{14} = 0$
$as_{23} = 0$
$SDIS_1 = 0$
$SDISS_2 = -0.4$

Here, since $TAI_1$ and $SDISS_1$ are zero, the matrix may be considered TA unstable (does not possess the ALCSVC property), and thus there may be no need to calculate convex combination coefficients.

With current practice TC methods, the disregard for signs of stability derivative information within a linear aircraft motion dynamics matrix may lead to misleading conclusions drawn by Routh-Hurwitz criterion-based conditions about the aircraft motion dynamics. Referring generally to matrices (e.g., 118, 124, 126, 128) in FIGS. 35-44, in an exemplary embodiment, by taking sign patterns of a given matrix into consideration right at the stability analysis stage, and deriving conditions such that a given matrix's sign pattern is accounted for, new conditions for State Variable Convergence of the given matrix may be derived (e.g., without subjecting the given matrix to transformations). An exemplary embodiment may ensure ALCSVC of a given LTISS system (regardless of whether the LTISS system is an AELTISS system or a non-AELTISS system).

Here, the ALCSVC property of a matrix is decided by sets of indices (e.g., as opposed to eigenvalues of the matrix). Here, an exemplary TA approach involves a novel technique to assess the ALCSVC property of a real matrix A, which may be in pure diagonal form and/or in an Upper or Lower Triangular form. An exemplary algorithm of system software incorporating exemplary ALCSVC evaluation may overcome several disadvantages of TC methods (e.g., Routh Hurwitz Criterion based methods concealing or obfuscating actual state variable convergence nature of a real matrix, such as in applications to linear aircraft longitudinal dynamics matrices). Exemplary ALCSVC evaluation in accordance with an exemplary TA approach may, by way of example and not limitation, permit improved autopilot design (e.g., the autopilot design may possess a higher degree of stability robustness under an exemplary TA approach).

FIG. 35 illustrates an exemplary matrix related to flight dynamics models, in a linear range, for Longitudinal motion of an aircraft. The following equation may be provided:

$$\dot{z} = A_{long} s$$

Here, $A_{long}$ may represent the longitudinal dynamics matrix (including the dimensional stability derivatives) and x may represent the state variable vector, comprising the states with $x_1 = u_{sp}$ (representing forward velocity change, from a Nominal Cruise speed $U_0$). Vertical velocity change may be represented as $x_2 = w$, pitch rate may be represented as $x_3 = q$, and pitch angle may be represented as $x_4 = \theta$. An exemplary dynamics matrix 118 thereof may comprise stability derivate information (conceptual representation represented by 118). Here, $X_u$ represents rate of change of drag force with respect to forward speed change usp, $X_w$ represents the rate of change of draft with respect to the vertical speed change w, $X_q$ represents the rate of change of drag with respect to pitch rate q, g represents constant acceleration due to gravity, $Z_u$ represents the rate of change of lift force with respect to forward speed change $u_{sp}$, $Z_w$ represents the rate of change of lift with respect to the vertical speed change w, Mu represents the rate of change of pitching moment coefficient with respect to the forward speed change $u_{sp}$, $M_w$ represents the rate of change of pitching moment coefficient with respect to vertical speed change w, $M_q$ represents the rate of change of pitching moment coefficient with respect to pitch rate q, and $M_\theta$ represents the rate of change of pitching moment coefficient with respect to the pitch angle θ (here, taken as zero). The second state variable w (vertical velocity) may be replaced by the term "angle of attack," represented by α, where $\alpha = w/U_0$.

Stability derivatives in the FIG. 35 model (elements of the 4th order matrix shown) may take on specific magnitudes and signs based on linearization about a specific flight condition, which may be specified as a function of Mach number, altitude, and constant horizontal speed the model is linearized about. It will be apparent to one of ordinary skill in the art that the term indicators used herein are merely illustrative, and exemplary embodiments are not necessarily limited to 4th order matrices. It will also be apparent that embodiments described for improving flight system control may be adjusted to be applicable to any number of other different technologies without departing from the scope of the present invention.

Referring now to FIG. 36, a 4th order original model for a particular flight condition is illustrated by exemplary matrix 120 (e.g., for an aircraft with a cruise speed of 168.8 ft/sec at a particular flight altitude). Here, −32.2 represents the constant gravitational acceleration the aircraft may experience. Here, 168.8 represents the constant forward speed of the aircraft (for which the linearized matrix is obtained, for evaluating elements at a given flight condition). An exemplary TA approach may avoid transformation of the exemplary matrix elements, thus avoiding altering sings and magnitudes thereof (which may negatively alter physics of $A_{long}$). The exemplary approach may determine state variable convergence of only a given real matrix, as it is, with the given sign pattern and magnitudes of elements of the given matrix.

FIG. 37 illustrates matrices 122 related to a TC approach including a linear, non-singular transformation with a non-orthogonal, arbitrary, non-singular matrix Z, applied to the given flight dynamics matrix $A_{long}$, resulting in two new transformed matrices $A_{eleft}$ and $A_{eright}$. This particular figure demonstrates that even where eigenvalues of matrices may be the same, there is no assurance that ALCSVC is satisfied. Here, the transformed $A_{eleft}$ and $A_{eright}$ matrices deviate from the original flight dynamics matrix, and do not accurately reflect correct flight dynamics of the $A_{long}$ model. Thus, the FIG. 36 embodiment avoiding transformation of exemplary matrix elements is preferred to traditional practices of finding eigenvalues for transformed matrices $A_{eleft}$ and $A_{eright}$. In an exemplary embodiment, TA conditions for the ALCSVC property of a real matrix are assigned without use of the known Routh-Hurwitz, Cayley Hamilton Theorem, or the Lyapunov Matrix Equation techniques. Altering the element sign pattern in flight dynamics models may be equivalent to altering the flight dynamics nature of a flight vehicle, thus an exemplary TA approach avoids altering of element sign pattern information.

When a real matrix possesses negative real part eigenvalues, but does not possess the ALCSVC property, a blind spot variable $x_{bsp}$ may determined based on the following:

$$x_{bsp} = \tau_1 \zeta_1 + \tau_2 \zeta_2 + tau_3 \zeta_3 + \tau_4 \zeta_4$$

In the aforementioned equation, $\tau_i$ represents a convex combination coefficient (where sum of $\tau_i = 1$), and $zeta_i$ may be hidden state variables, different from original, untransformed state variables $x_i$ (e.g., $u_{sp}$, w, q, θ).

Generally speaking, the trace of any 4th order real square matrix A may be given by the sum of its diagonal elements:

$$a_{11} + a_{22} + a_{33} + a_{14} = -\beta \quad \beta \geq 0$$

In an exemplary TA approach, the trace value, in contrast to being viewed as a sum of individual diagonal elements, may be viewed as a sum of new indices, labeled as adjacent repeat diagonal mini-traces ("ARDMTs"). Exemplary ARDMTs may be provided in terms of an original diagonal element as follows:

$$a_{11} + a_{22} + a_{33} + a_{44} = (a_{11} + a_{44})/2 + (a_{11} + a_{44})/2 + (a_{22} + a_{33})/2 + (a_{22} + a_{33})/2$$

Here, the indices $(a_{11} + a_{44})/2$ and $(a_{22} + a_{33})/2$ may be designated as ARDMTs. In an exemplary TA approach, ARDMTs may always be expressed in a repeated, diagonal format. For a given 4th order matrix, the TAIs may be defined as follows:

$$TAI_1 = (a_{11} + a_{44})/2$$

$$TAI_2 = (a_{22} + a_{33})/2$$

With respect to a symmetric part $A_{sym}$ of the real matrix A, real eigenvalues may be $\lambda_{Rs1}$, $\lambda_{Rs2}$, $\lambda_{Rs3}$, $\lambda_{Rs4}$, and the following sum may add up to a full trace $-\beta$:

$$(\lambda_{Rs1} + \lambda_{Rs4})/2 + (\lambda_{Rs1} + \lambda_{Rs4})/2 + (\lambda_{Rs2} + \lambda_{Rs3})/2 + (\lambda_{Rs2} + \lambda_{Rs3})/2$$

Two additional indices, SDISSs, may be defined as follows:

$$SDISS_1 = (\lambda_{Rs1} + \lambda_{Rs4})/2$$

$$SDISS_2 = (\lambda_{Rs2} + \lambda_{Rs3})/2$$

A necessary condition for ALCSVC may include that none of the aforementioned indices be zero or positive. The following may further be observed in accordance with the above exemplary equations:

$$ModTAI_1 + ModTAI_2 = \beta/2$$

$$ModSDISS_1 + ModDISS_2 = \beta$$

$$\beta \geq 0.$$

SDIOS indices may also be included, where SDIOS indices are motivated by a skew-symmetric part of the real matrix A, denoted by the following:

$$A_{sksym} = (A - A^T)/2.$$

OS links and $SS_{OO}$ links may represent oscillations in time responses. Where oscillations are of an excessive magnitude (e.g., may occur when real parts are low and imaginary parts are high), issues with system control may occur. Imaginary parts associated with zero real parts may be considered to be maximum overshoot causing frequencies. Maximum absolute imaginary parts within pure imaginary pair eigenvalues of the $A_{sksym}$ matrix may be an indicator of oscillations causing excessive overshoot by the control system. A maximum imaginary part may be labeled as OvershootLimitedConvergenceIndex (OLCI). Another necessary condition for ALCSVC may include that OLCI be less than β. For certain exemplary matrices, the OLCI index may not be necessary. The condition that the given real matrix A and its SubCMP4A as well as the SuperCMP4A have non-negative, real part eigenvalues may be sufficient.

Referring to FIG. 41, an exemplary longitudinal matrix 130 is shown. For an exemplary system to satisfy the ALCSVC property of the LTISS shown, indices may be calculated (e.g., TAIs, SDISSs, OLCIs). Here, forming the TAIs may provide the following:

$TAI_1 - 0.0225$ $TAI_1 - 2.484$

Referring to FIG. 42, by computing the SDISSs (based on formed $A_{symtc}$ and $A_{sksymtc}$ matrices, 132), the following may be provided:

Computing the $A_{symtc}$ real eigenvalues, we observe that $\lambda_{Rs1}$ and $\lambda_{Rs4}$ are give by $\lambda_{Rs1} = -86.8676$ $\lambda_{Rs4} = 72.8997$ so that $SDISS_1 = -2.48395$ Then $\lambda_{Rs2}$ and $\lambda_{Rs3}$ are given by $\lambda_{Rs2n} = -16.1212$ $\lambda_{Rs2p} = 16.0761$ so that $SIDSS_2 = -0.0451$ Thus, both SDISSs are negative. The OLCI may then be computed and compared to β. Here, OLCI=84.4211 and p=5.0130, which violates an overshoot condition of ALCSVC. Since this example system does not posses ALCSVC property, an inference may be made that the system includes blind spot state variables which are diverging. Determination of the convex combination of phase variables diverging may become necessary. To determine convex combination coefficients Ti for which there exists a blind spot state variable divergence, Routh Hurwitz Polynomial coefficients may need to be obtained (e.g, form SubCMP4A matrix). An exemplary SubCMP4A matrix 134 is shown in FIG. 43.

The FIG. 43 matrix c134 comprises negative real part eigenvalues. Examination of R-H characteristic polynomial coefficients ($c_{ia}$) here may reveal two coefficients have magnitudes much greater than 1 and two coefficients have magnitudes much lower than 1 (may suggests existence of blind spot state variable divergence). The following exemplary procedure may be employed by an exemplary system for determining the convex combination coefficients of the original state variables which is diverging:

Step-1: Divide all the $c_{ia}$ coefficients of the above SubCMP4A matrix by the trace coefficient and form the Trace Normalized Coefficients, denoted by $c_{1an}=1$, $c_{2an}=c_{2a}/c_{1a}$, $c_{3an}=c_{3a}/c_{1a}$, $c_{4an}=c_{4a}/c_{1a}$.

Step-2: Add these trace normalized coefficients and label that sum as CNT.

Step-3: Form the Convex Combination Coefficients $tau_i=c_{ian}/CNT$.

Then the Blind Spot State Variable is given by $$x_{bsp}=\tau_1\zeta_1+\tau_2\zeta_2+tau_3\zeta_3+\tau_4\zeta_4$$

where $zeta_i$, for this example, are $x_{iendph}$ variables.

The aforementioned exemplary procedure may provide the following $\tau_i$ values:

$\tau_1=0.26345$ $\tau_2=0.67137$ $\tau_3=0.03431$
$\sigma_4=0.03084$

The above coefficient magnitudes add up to 1 (e.g., qualifying them to be convex combination coefficients, where magnitudes thereof are freely interchangeable between the four coefficients). Where the negative of any aforementioned coefficient number (in any order) is substituted into the SubCMP4A matrix (replacing R-H polynomial coefficients), a matrix 136 as shown in FIG. 44 may be generated.

Here, FIG. 44 matrix 136 elements have non-negative real part eigenvalues, confirming that there is blind spot state variable divergence in the LTISS system. The forgoing may demonstrate that blind spot state variables are a function of phase variables obtained by SubCMP4A (and also by SuperCMP4A). It will be apparent to one of ordinary skill in the art that an exemplary TA approach may be incorporated into any number of different actuator adjustment algorithms for providing control to a device based on sensor feedback from the device. An exemplary TA approach permits exemplary organization of sensor input data and comparison of said data to any number of different parameters for the purpose of verifying and/or framing control objectives to promote device performance.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for providing a control system, the system comprising:
   a processor, adapted to control a device;
   a sensor, adapted to communicate to the processor a measured variable of the device;
   wherein the processor is configured to predict instability in control of the device by using a plurality of non-eigenvalue indices;
   wherein the processor is configured to adjust the device by providing feedback reflecting instability in control predicted by the processor to an actuator; and
   wherein the plurality of non-eigenvalue indices include at least one selected from the group of a transformation allergic index, a stability definite index, and an overshoot limited convergence index.

2. The system of claim 1 wherein:
   the plurality of non-eigenvalue indices includes a transformation allergic index.

3. The system of claim 1 wherein:
   the plurality of non-eigenvalue indices includes a stability definite index.

4. The system of claim 1 wherein:
   the actuator comprises a servomotor.

5. The system of claim 1 wherein:
   the processor is further configured to predict instability in control of the device without computing eigenvalues.

6. The system of claim 1 wherein:
   the processor is further configured to determine whether all linear combination state variable convergence occurs based on the measured variable.

7. The system of claim 6 wherein:
   the measured variable relates to pitch angle or pitch angular velocity in longitudinal motion of an aircraft.

8. The system of claim 6 wherein:
   the device relates to at least one selected from a group of disciplines comprising aerospace engineering, automotive engineering, robotics engineering, microgrid stability, electrical energy, and power systems.

9. The system of claim 1 wherein:
   the processor is further configured to account for sign patterns of a given matrix at the beginning of a stability analysis stage for predicting instability in control of the device.

10. The system of claim 2 wherein:
    the feedback to the actuator reflecting instability in control predicted by the processor is capable of permitting achievement of a control objective of the system.

11. The system of claim 1 wherein:
    the plurality of non-eigenvalue indices includes an overshoot limited convergence index.

12. A system for providing a control system, the system comprising:
    a processor, adapted to control a device;
    a sensor, adapted to communicate to the processor a measured variable of the device;
    wherein the processor is configured to predict instability in control of the device by using a plurality of non-eigenvalue indices;

wherein the plurality of non-eigenvalue indices include a transformation allergic index;

wherein the plurality of non-eigenvalue indices include a stability definite index;

wherein the processor is configured to determine whether all linear combination state variable convergence occurs based on the measured variable;

wherein the processor is configured to adjust the device by providing feedback to an actuator, the feedback reflecting instability in control predicted by the processor.

13. The system of claim 12 wherein:

the processor is further configured to predict instability control of the device without computing eigenvalues.

14. The system of claim 13 wherein:

the device relates to at least one selected from a group of disciplines comprising aerospace engineering, automotive engineering, robotics engineering, microgrid stability, electrical energy, and power systems.

15. The system of claim 12 wherein:

the processor is further configured to account for sign patterns of a given matrix at a stability analysis stage for predicting instability in control of the device.

16. A method for providing a control system, the method comprising:

providing a processor, adapted to control a device;

providing a sensor, adapted to communicate to the processor a measured variable of the device;

configuring the processor to predict instability in control of the device by using a plurality of non-eigenvalue indices;

configuring the processor to adjust the device by providing feedback to an actuator, the feedback reflecting instability in control predicted by the processor; and wherein the plurality of non-eigenvalue indices include at least one selected from the group of a transformation allergic index, a stability definite index, and an overshoot limited convergence index.

17. The method of claim 16 wherein:

the plurality of non-eigenvalue indices include a transformation allergic index and a stability definite index.

18. The method of claim 16 further comprising:

configuring the processor to predict instability in control of the device without considering eigenvalues.

19. The method of claim 16 further comprising:

configuring the processor to determine whether all linear combination state variable convergence occurs based on the measured variable.

20. The method of claim 16 further comprising:

configuring the processor to account for sign patterns of a given matrix at a stability analysis stage for predicting instability control of the device.

* * * * *